Patented Mar. 19, 1935

1,994,845

UNITED STATES PATENT OFFICE 1,994,845

PREPARATION OF AMINES OF THE BENZENE SERIES

Alexander John Wuertz, Wilmington, Del., assignor to E. I. du Pont de Nemours & Company, Wilmington, Del., a corporation of Delaware No Drawing. Application June 30, 1931,
Serial No. 548,034

21 Claims. (Cl. 260—130.5)

This invention relates to the preparation of carbon compounds and more particularly to the preparation of amino derivatives of the benzene series. It especially contemplates the ammonolysis of halogeno-benzenes.

The invention has for an object the preparation of amino-benzenes by new chemical processes. Other objects are the preparation of these compounds in a very pure state, in high yields, by processes which are simple and which may be readily carried out. A still further object is an advancement of the art. Other objects will appear hereinafter.

These objects are accomplished by the treatment of halogeno-benzenes with strong aqueous solutions of ammonia in the presence of one or more inorganic oxidants. The invention also contemplates the optional use of a catalyst.

The invention will be further understood from a consideration of the following examples in which the parts are given by weight.

EXAMPLE I

Preparation of aniline

Into a suitable autoclave there was charged 450 parts of chloro-benzene, 7 parts of potassium chlorate, 25 parts of ammonium nitrate and 15 parts of reduced copper. Thereafter 2,200 parts of 28% ammonia was added, the autoclave closed and the temperature gradually raised to 180° C. This temperature was maintained for 16 hours. The charge was then transferred to a suitable distillation apparatus, made alkaline with sodium hydroxide and the ammonia distilled off. The aniline resulting from this operation was isolated by fractional distillation. This product was found to be exceptionally pure.

EXAMPLE II

Preparation of para-phenylene-diamine

Into a suitable autoclave there was charged 220.5 parts of para-di-chloro-benzene, 5 parts of potassium chlorate, 25 parts of ammonium nitrate and 15 parts of reduced copper. Two thousand four hundred (2,400) parts of 28% aqueous ammonia were then added. The autoclave was then closed and the temperature gradually raised to 180° C. This temperature was maintained for approximately 16 hours after which the charge was transferred to a distillation apparatus. The ammonia was recovered by distillation and thereafter the charge evaporated to dryness. The evaporated charge, which consisted of a dark powder, was placed in a suitable apparatus and the para-phenylene-diamine recovered by distillation in vacuo. A product of pleasing appearance somewhat resembling rock candy the color of which varied from white to a straw yellow, was obtained.

EXAMPLE III

Preparation of para-nitro-aniline

Three hundred seventy-five (375) parts of para-nitro-chloro-benzene, 4.5 parts of potassium chlorate and 35 parts of ammonium nitrate were charged into an autoclave. Thereafter 2,300 parts of 28% aqueous ammonia was added, the autoclave closed and the temperature slowly raised to 165° C. This temperature was maintained for a period of approximately 20 hours. The resultant reaction mass was transferred to a vessel containing lime. The remaining ammonia was removed by steam distillation and the residual mass transferred to a wooden tub and allowed to cool. The solid para-nitro-aniline was recovered from the cool mass by filtration, washed free of mother liquor and dried in the usual manner. The para-nitro-aniline thus obtained consisted of bright yellow crystals. These crystals gave a clear diazonium salt solution when treated in the usual manner. Titration with sodium nitrite showed the product to be essentially pure para-nitro-aniline.

The invention is not limited to the exact details given in the above examples. In general the various isomers and homologues of the chloro compounds of the benzene series may be used satisfactorily. The results obtainable by using as starting substances such compounds as ortho-nitro-chloro-benzene, ortho-di-chloro-benzene, di-chloro-benzoyl-ortho-benzoic acids, chloro-toluenes, nitro-chloro-toluenes and para-di-bromo-benzene, merit special mention.

The temperatures at which the processes of this invention are carried out, as will be obvious to one skilled in the art, depend upon the particular starting compound and the other ingredients of the reaction mass. In general the preferred temperature range is between 150° and 225° C.

In carrying out the process the chlorates may be replaced by other compounds, such as perborates, perchlorates, dichromates and the like. Very good results are obtained by replacing the chlorates with calculated quantities of salts of perchloric acid.

Because of its availability, potassium chlorate is generally used, but it is to be understood that the corresponding salts of other alkali metals give equivalent results.

In the examples ammonium nitrate has been used. This may be replaced with other alkali metal nitrates, for example, sodium nitrate.

The strength of the aqueous ammonium solution may be varied, but preferably the concentration is that corresponding to a 20 to 50% ammonia (NH3) content. With decreasing concentration of the ammonia solution increasing temperatures may be used advantageously.

In general, for a given concentration of ammonia the use of higher temperatures results in completion of the reaction in a shorter time.

This is applicable to halogeno-benzenes in general. Bromo-benzenes also give very desirable results.

The invention is not limited to the use of metallic copper nor any particular copper salt as a catalyst. Other metals or metal salts, for instance, the salts of the metals or the metals themselves which follow copper in the electromotive series are used advantageously. Special mention may be made of copper nitrate, cuprous oxide and silver chloride.

By the term "reduced copper" it is intended to cover metallic copper in any physical form, preferably precipitated copper in the form of a fine copper powder or sponge.

The process of this invention has several very important and distinct advantages over any other processes known to the prior art. Among these may be mentioned the fact that the yields of amino-benzenes obtained are substantially theoretical, the products of the process are so pure as to render unnecessary special or additional purification steps, the processes may be carried out at lower temperatures than heretofore deemed possible, and the quantities of materials per charge can be greatly increased in proportion to the ammonia content of the autoclave. This last mentioned advantage is of particular importance in commercial processes.

As many apparently widely different embodiments of this invention may be made without departing from the spirit and scope thereof, it is to be understood that I do not limit myself to the specific embodiments thereof except as defined in the appended claims.

I claim:

1. The process which comprises treating chlorobenzene with aqueous ammonia in the presence of potassium chlorate and ammonium nitrate at a temperature of 160° to 220° C.

2. In the process of preparing amines, the step which comprises reacting a chlorobenzene with aqueous ammonia in the presence of an inorganic oxidizing salt soluble in aqueous ammonia.

3. The process of claim 2 in which the reaction is effected in the presence of a catalyst taken from the group consisting of copper and silver and their salts soluble in aqueous ammonia.

4. The process of claim 2 in which a copper catalyst is present.

5. In the process of preparing amines, the step which comprises reacting a chlorobenzene with aqueous ammonia in the presence of an inorganic chlorate soluble in aqueous ammonia.

6. In the process of preparing amines, the step which comprises reacting a chlorobenzene with aqueous ammonia in the presence of an alkali metal chlorate.

7. In the process of preparing amines, the step which comprises reacting a chlorobenzene with aqueous ammonia in the presence of an inorganic chlorate and an inorganic nitrate which are soluble in aqueous ammonia.

8. In the process of preparing amines, the step which comprises reacting a chlorobenzene with aqueous ammonia in the presence of an alkali metal chlorate and an inorganic nitrate soluble in aqueous ammonia.

9. In the process of preparing amines, the step which comprises reacting a chlorobenzene with aqueous ammonia in the presence of an alkali metal chlorate and an alkali metal nitrate.

10. The process which comprises treating a chlorobenzene with aqueous ammonia in the presence of an alkali metal chlorate and an alkali metal nitrate at temperatures between 150° and 225° C.

11. In the process of preparing amines, the step which comprise reacting a halogen-substituted benzene with aqueous ammonia in the presence of an inorganic oxidizing salt soluble in aqueous ammonia.

12. The process of claim 11 in which the oxidizing agent is an alkali metal chlorate.

13. In the process of preparing amines, the step which comprises reacting a halogen-substituted benzene with aqueous ammonia in the presence of an alkali metal chlorate and an alkali metal nitrate.

14. The process of claim 11, characterized in that the reaction is carried out in the presence of a catalyst taken from the group consisting of copper and silver and their salts soluble in aqueous ammonia.

15. The process of claim 11 in which the reaction is carried out in the presence of a copper catalyst.

16. In the process of preparing amines, the step which comprises reacting a halogen-substituted benzene with aqueous ammonia in the presence of an alkali metal chlorate and ammonium nitrate.

17. In the process of preparing amines, the step which comprises reacting a chlorobenzene with aqueous ammonia in the presence of an alkali metal chlorate and ammonium nitrate.

18. In the process of preparing para-nitro-aniline, the step which comprises reacting para-nitro-chloro benzene with aqueous ammonia in the presence of an alkali metal chlorate and ammonium nitrate.

19. In the process of preparing ortho-nitro-aniline, the step which comprises reacting ortho-nitro-chloro benzene with aqueous ammonia in the presence of an alkali metal chlorate and ammonium nitrate.

20. In a process of producing nitro-amino-benzenes, the step which comprises reacting a nitro-chlorobenzene, in which at least one of the positions ortho and para to a chlorine atom in the benzene nucleus contains a nitro group, with aqueous ammonia in the presence of an inorganic oxidizing salt soluble in aqueous ammonia.

21. In the process of preparing aminobenzenes, the step which comprises reacting a compound having the following formula:

in which $n$ is one or two, with aqueous ammonia in the presence of an alkali metal chlorate, ammonium nitrate and a catalyst taken from the group consisting of copper and silver and their salts soluble in aqueous ammonia.

A. J. WUERTZ.